Jan. 31, 1956
W. M. SMITH
2,733,043
WEDGE TYPE SEAL FOR SUCTION STRAINER
Filed April 10, 1953
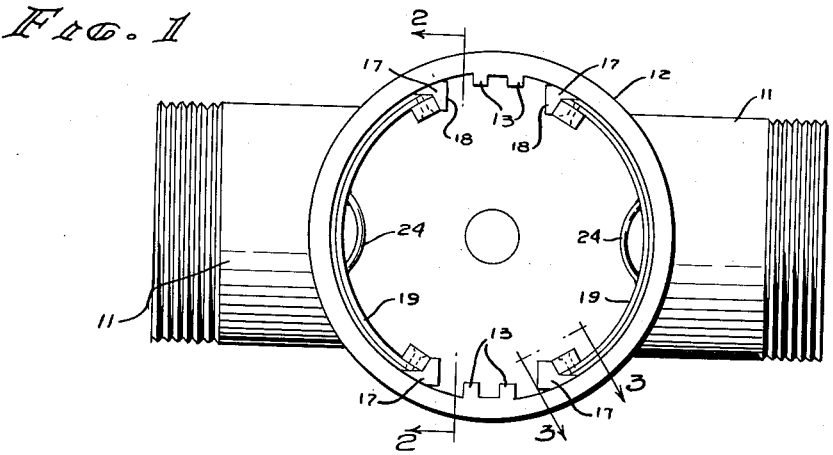
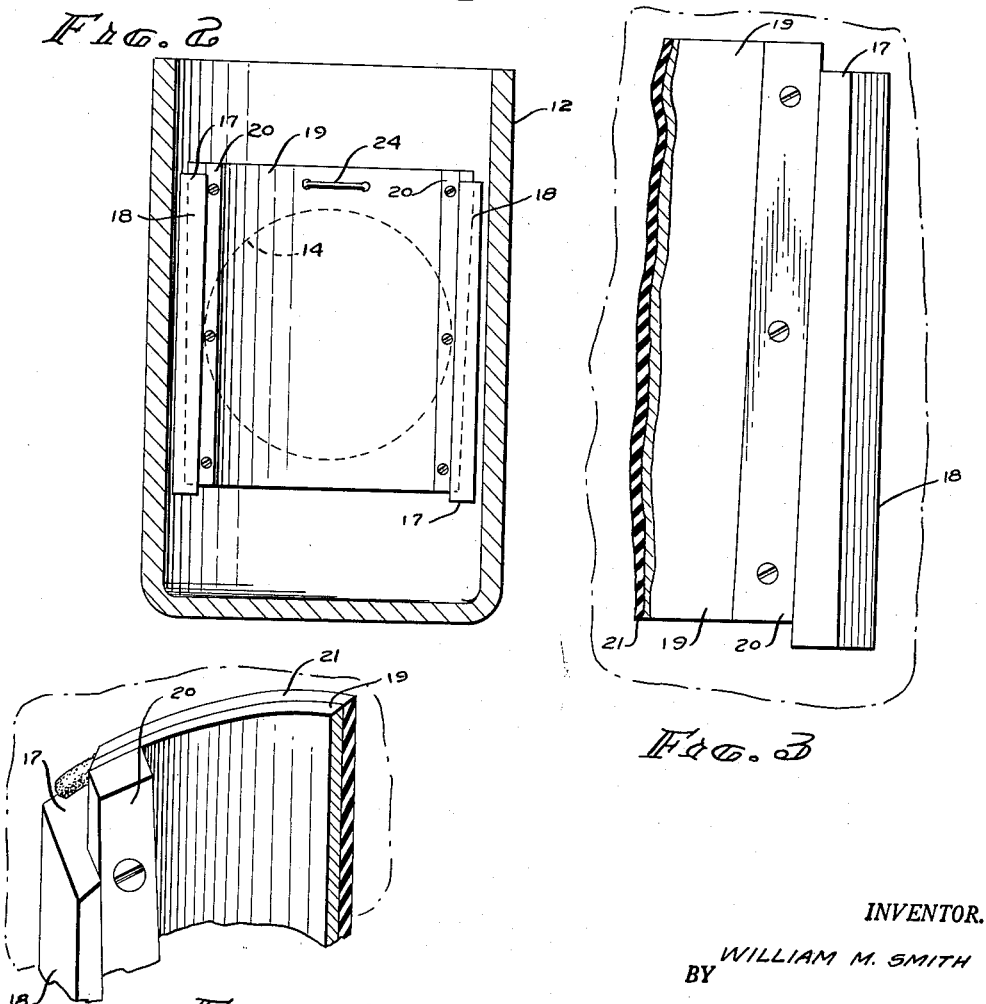
INVENTOR.
WILLIAM M. SMITH
BY
McMorrow, Berman + Davidson
ATTORNEYS

United States Patent Office 2,733,043
Patented Jan. 31, 1956

2,733,043

WEDGE TYPE SEAL FOR SUCTION STRAINER

William M. Smith, Maysville, Okla.

Application April 10, 1953, Serial No. 348,034

1 Claim. (Cl. 251—176)

This invention relates to valve devices for liquid distribution lines, and more particularly to an improved manually operated valve device for shutting off the flow of liquid in a conduit provided with a strainer chamber.

A main object of the invention is to provide a novel and improved sealing device for at times shutting off the flow of liquid in a liquid distribution line, as for example, in an irrigation system, oil line, or the like, of the type provided with a strainer chamber, the arrangement being such that liquid may be pumped through the line without going through the strainer, the improved device being simple in construction, being easy to install, and providing a liquid tight seal.

A further object of the invention is to provide an improved sealing device for a liquid distribution line provided with a strainer chamber, the improved device involving inexpensive components, being sturdy in construction, and being readily installed or removed, as required.

Further objects and advantages of the invention will become apparent from the following description and claim, and from the accompanying drawings, wherein:

Figure 1 is a top view of a conduit forming part of a liquid distribution line and provided with a strainer chamber in which is installed an improved sealing device according to the present invention.

Figure 2 is a vertical cross sectional view taken on the line 2—2 of Figure 1.

Figure 3 is an enlarged elevational detail view taken on the line 3—3 of Figure 1 and showing the cooperating wedging elements at one side of the sealing plate in the structure of Figures 1 and 2.

Figure 4 is an enlarged fragmentary perspective view of one of the upper corner portions of the sealing plate and the cooperating abutment element adjacent thereto of the structure illustrated in Figures 1, 2 and 3.

Referring to the drawings, 11 designates a conduit which may be connected in a liquid distribution line, as for example, in an irrigation line, and 12 designates a vertical cylindrical chamber provided at the intermediate portion of the conduit 11, said chamber being formed with the opposed pairs of vertical guide ribs 13, 13 for slidably receiving the side edges of a vertical strainer for supporting said strainer in a vertical position in the chamber 12 in the manner illustrated in my prior Patent 2,552,744. It will be understood that the chamber 12 is provided with a suitable top cover which may be manually removed, whenever desired, and that the strainer may be secured to said top cover, as in my above identified prior patent, whereby the strainer may be removed by merely lifting the top cover.

As shown in Figure 1, the diameter of the vertical chamber 12 is substantially greater than the diameter of the conduit 11, whereby circular ports 14 are defined at the respective junctions of the segments of the conduit 11 with the chamber wall. Rigidly secured to the inside surface of the chamber at opposite sides of the respective ports 14 are the substantially vertical abutment members 17, 17, said abutment members being of angular cross section, as shown in Figure 1, and being arranged in opposition to each other at the opposite sides of the respective ports 14. As shown in Figure 3, the abutment member 17 preferably flares downwardly in thickness, whereby said abutment members are generally wedge-shaped and have the vertical outer sides 18.

Designated at 19 is a cylindrically curved sealing plate of suitable metal or similar sturdy material, said plate member 19 being shaped to fit between the opposed pairs of abutment members 17, 17 at the opposite sides of a port 14. Secured to the side edges of each plate member 19 are the rigid abutment bars 20 adapted to abut the inside surfaces of the abutment members 17 and to wedgingly cooperate with said abutment members. Secured to the convex surfaces of the cylindrically curved plate members 19 are the linings of resilient deformable material, shown at 21, said linings being of rubber or similar material and being adapted to make sealing contact with the inside surfaces of the chamber 12 between the respective abutment members 17, 17 at opposite sides of the ports 14.

Secured to the concave inner surfaces of the plate members 19 adjacent their top margins are the respective handles 24. As shown in Figure 1, a plate member 19 and its associated elements is provided for each side of the chamber 12, whereby either port 14 may be sealed, or both ports 14 may be sealed, if so desired.

To insert one of the sealing devices to close off a desired port 14, it is merely necessary to move the plate member 19 and its associated elements over the port 14 with the side edges of the plate, namely, with the abutment bars 20 thereof, in engagement with the inside surfaces of the abutment members 17, 17. The descent of the plate member 19 will cause the members 20, 20 to wedgingly engage the abutment members 17 and will distort the plate 19 to cause the sealing lining 21 thereof to firmly engage against the inside surface of the chamber 12 around the port 14. This provides a tight sealing contact and effectively closes off the port 14. To remove the seal, it is merely necessary to elevate the plate member 19 by means of its handle 24, whereby the port 14 will be opened.

While a specific embodiment of an improved sealing device for use in the strainer chamber of a liquid distribution line has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a liquid distribution line, a conduit, a substantially vertical cylindrical chamber connected in said conduit, said chamber having ports opening to said conduit, and means for at times sealing a port comprising a pair of substantially vertical abutment members secured to the wall of the chamber at the opposite sides of the port, said abutment members comprising respective bar members flaring downwardly in thickness, a cylindrically curved sealing plate having similar curvature to said walls wedgingly engageable between said abutment members, a lining of resilient deformable material on the convex surface of said sealing plate, and respective rigid abutment bars secured to the side margins of said plate and being respectively engageable with said abutment members.

References Cited in the file of this patent

UNITED STATES PATENTS

| | | |
|---|---|---|
| 863,764 | Taylor | Aug. 20, 1907 |
| 958,021 | Snow | May 17, 1910 |
| 1,053,327 | Stebbins | Feb. 18, 1913 |
| 2,000,352 | Pease | May 7, 1935 |
| 2,263,617 | Daniel | Nov. 25, 1941 |